(12) United States Patent
Gupta et al.

(10) Patent No.: US 11,288,601 B2
(45) Date of Patent: Mar. 29, 2022

(54) SELF-LEARNING SELECTION OF INFORMATION-ANALYSIS RUNTIMES

(71) Applicant: INTERNATIONAL BUSINESS MACHINES CORPORATION, Armonk, NY (US)

(72) Inventors: Ritesh Kumar Gupta, Hyderabad (IN); Namit Kabra, Hyderabad (IN); Eric Allen Jacobson, Arlington, MA (US); Scott Louis Brokaw, Groton, MA (US); Jo Arao Ramos, Grapevine, TX (US)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 16/360,118

(22) Filed: Mar. 21, 2019

(65) Prior Publication Data
US 2020/0302343 A1    Sep. 24, 2020

(51) Int. Cl.
*G06N 20/20*    (2019.01)
*G06N 5/04*    (2006.01)
(Continued)

(52) U.S. Cl.
CPC .......... *G06N 20/20* (2019.01); *G06K 9/6256* (2013.01); *G06N 5/025* (2013.01); *G06N 5/04* (2013.01); *G06K 9/6259* (2013.01)

(58) Field of Classification Search
CPC ........ G06N 20/00; G06N 20/10; G06N 20/20; G06N 5/02; G06N 5/022; G06N 5/025; G06N 5/04; G06K 9/6256; G06K 9/6259
See application file for complete search history.

(56) References Cited

U.S. PATENT DOCUMENTS 7,577,934 B2   8/2009 Anonsen
8,904,339 B2  12/2014 Mitchell
(Continued)

FOREIGN PATENT DOCUMENTS

WO    20172179571 W   12/2017

OTHER PUBLICATIONS

Mell, Peter et al.; "The NIST Definition of Cloud Computing;" National Institute of Standards and Technology; Special Publication 800-145; Sep. 2011; 7 pages.
(Continued)

*Primary Examiner* — Shane D Woolwine
(74) *Attorney, Agent, or Firm* — Schmesier, Olsen & Watts; Wiliam H. Hartwell

(57) ABSTRACT

A self-learning computer-based system has access to multiple runtime modules that are each capable of performing a particular algorithm. Each runtime module implements the algorithm with different code or runs in a different runtime environment. The system responds to a request to run the algorithm by selecting the runtime module or runtime environment that the system predicts will provide the most desirable results based on parameters like accuracy, performance, cost, resource-efficiency, or policy compliance. The system learns how to make such predictions through training sessions conducted by a machine-learning component. This training teaches the system that previous module selections produced certain types of results in the presence of certain conditions. After determining whether similar conditions currently exist, the system uses rules inferred from the training sessions to select the runtime module most likely to produce desired results.

20 Claims, 5 Drawing Sheets

(51) Int. Cl.
*G06N 5/02* (2006.01)
*G06K 9/62* (2022.01)

(56) References Cited

U.S. PATENT DOCUMENTS

| | | | |
|---|---|---|---|
| 9,576,240 B2 | 2/2017 | Jeong | |
| 2016/0371585 A1* | 12/2016 | McElhinney | G05B 23/0254 |
| 2017/0017576 A1 | 1/2017 | Cammarota | |
| 2017/0248995 A1* | 8/2017 | Wang | G05B 13/048 |
| 2017/0262818 A1* | 9/2017 | Horrell | G06Q 10/0635 |

OTHER PUBLICATIONS

Concertio; Optimizer Runtime; https://concertio.com/optimizer-runtime/; retrieved from the Internet Sep. 25, 2018; 5 pages.

Dollinger, Jean-Francois; Adaptive Runtime Selection for GPU; 42nd International Conference on Parallel Processing (ICPP); vol. 1, pp. 70-79; Oct. 1-4, 2013.

Google App Engine; Product Documentation; https://cloud.google.com/appengine/docs/the-appengine-environments; retrieved from the Internet Sep. 25, 2018; 11 pages.

Hutter, Frank et al.; Algorithm Runtime Prediction: Methods & Evaluation; Proceedings of the Twenty-Fourth International Joint Conference on Artificial Intelligence; Jul. 27-31, 2015; pp. 4197-4201.

Van Der Merwe, Heila et al.; Environment Modeling Using Runtime Values for JPF-Android; ACM SIGSOFT Software Engineering Notes; vol. 40, No. 6; Nov. 2015; 5 pages.

\* cited by examiner

SELF-LEARNING SELECTION OF INFORMATION-ANALYSIS RUNTIMES

BACKGROUND

The present invention relates in general to information-analysis and data-analysis technologies and in particular to the automated selection of runtime modules that implement information-analysis and data-analysis algorithms.

Information-analysis and data-analysis technologies may comprise cognitive and non-cognitive algorithms that aggregate, organize, filter, validate, transform, correlate, or model the contents of source datasets. These systems are used in fields as diverse as business decision-support, scientific hypothesis-testing, predictive analysis, data mining, statistical analysis, and business intelligence.

Information analysis differs from data analysis in that information analysis treats data as semantically meaningful information that can be visualized or otherwise straightforwardly interpreted by human users. Information analysis can thus comprise artificially intelligent algorithms that perform semantically aware operations like natural-language processing, semantic analytics, or machine-learning.

Current data-analysis and information-analysis systems sometimes provide multiple executable runtime versions of a particular algorithm, each of which may be compatible with a distinct runtime environment or platform. This allows users or administrators to manually choose a runtime program or runtime environment for each algorithm. The choice of an executable runtime or runtime environment can determine an algorithm's performance, accuracy, or efficiency, but the relative benefits of each choice can vary for different input datasets, the current state of a runtime environment, or extrinsic factors.

For example, a first runtime module that implements an algorithm on one platform may run more efficiently when processing larger datasets, but a second runtime module that implements the algorithm on a different platform may be a better choice for smaller datasets. Similarly, system policies, resource availability, platform costs, and even weather conditions can temporarily render one runtime choice more resource-efficient, less expensive, faster, more accurate, or more compliant than a second choice.

SUMMARY

Embodiments of the present invention include information-analysis systems, methods, and computer program products for the self-learning selection of information-analysis runtimes. The system receives a request to perform an algorithm that may be implemented by any of at least two candidate runtime modules. The system identifies a set of currently existing factors capable of influencing the system's selection of an optimal runtime module from the candidate modules. A machine-learning component has trained the system to predict the outcome of choosing any of the candidate modules when the set of influencing factors are present. This training is performed by submitting to the system records that describe previous outcomes when any of the candidate modules performed the algorithm in the past. The system correlates the past behavior of each module with the current state of the influencing factors to select an optimal module that produces an outcome that best satisfies a set of preselected selection criteria. The system then runs the optimal module and saves the results produced by the module for inclusion in future training sessions.

DETAILED DESCRIPTION

Figure 1:
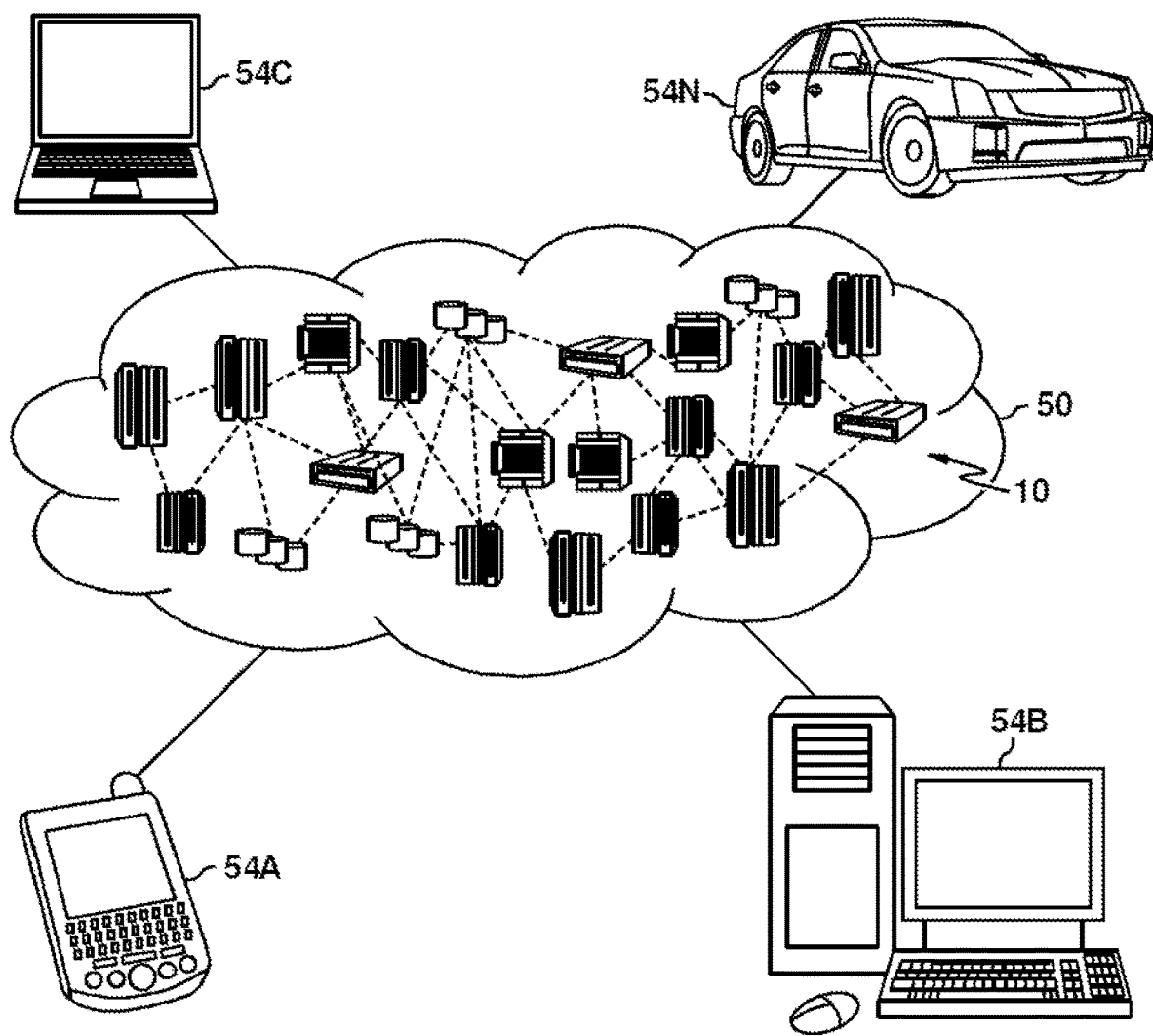
FIG. 1 depicts a cloud computing environment according to an embodiment of the present invention.

Some vendors of information-analysis, data-analysis, and other types of complex software systems offer users multiple runtime versions of a particular algorithm, software tool, or module. Each version may have been tailored to a particular runtime environment or may have been implemented in a different programming, query, or scripting language or with an environment-specific runtime library.

Each runtime implementation of a particular algorithm may provide a different level of performance, accuracy, or resource efficiency for a particular type of input dataset or operational context. For example, some runtimes run faster or consume fewer computing resources when written in a particular programming language, query language, or scripting language, or when tailored to run in a particular operating system, container, platform, operating system, file system, or other type of runtime environment. Certain platforms, such as hosted cloud-computing environments, can charge runtime fees that make those platforms inherently expensive in comparison to non-hosted runtime environments. And when an algorithm is to be performed on a source database, implementing the algorithm as a runtime query written in the database's native query language could be more efficient than extracting the database contents to an external data structure and then running the algorithm as an application written in a general-purpose programming language.

Other considerations can make selecting an optimal runtime environment or runtime module even more complex. Some runtime choices, for example, may be more efficient when processing larger volumes of data, making it important to consider the size of a source dataset when selecting a runtime. In another example, a performance advantage gained by executing a runtime optimized for its local runtime environment might be offset by the cost to move remote data to that local environment. In such a case, a lower-performance runtime running in the dataset's native environment could be a better choice than one that requires the remote dataset to be copied to the higher-performance local environment. Governance rules. system policies, security or privacy constraints, or General Data Protection Regulations (GDPR) can also bar the movement of certain types of secured data to what would otherwise be a more efficient runtime environment or even bar any performance of a particular algorithm in certain runtime environments.

These and other factors can change dynamically, making it necessary to identify the time at which an algorithm is to be run or the current state of other environmental or extrinsic conditions. For example, some runtime environments incur variable processing fees as a function of the time of day, a day of the week, the occurrence of a holiday, or the current season of the year. In other cases, if a particular operating environment is known to already be processing a heavy workload, that environment may not be able to provide its usual level of performance. Similarly, a hosted operating environment, such as a cloud-based platform-as-a-service (PaaS), infrastructure-as-a-service (IaaS), or software-as-a-service (SaaS) platform, may occasionally install upgrades that change the environment's performance, cost structure, resource availability, or efficiency.

Embodiments of the present invention address these issues by using methods of artificial intelligence and machine-learning to automate information-analysis, data-analysis, and other technologies and systems that allow users to select runtime executables and runtime environments. These embodiments comprise automated, self-learning runtime-selection components that automatically identify optimal runtimes as a function of historical records, current runtime conditions, extrinsic factors, and characteristics of the dataset to be processed.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
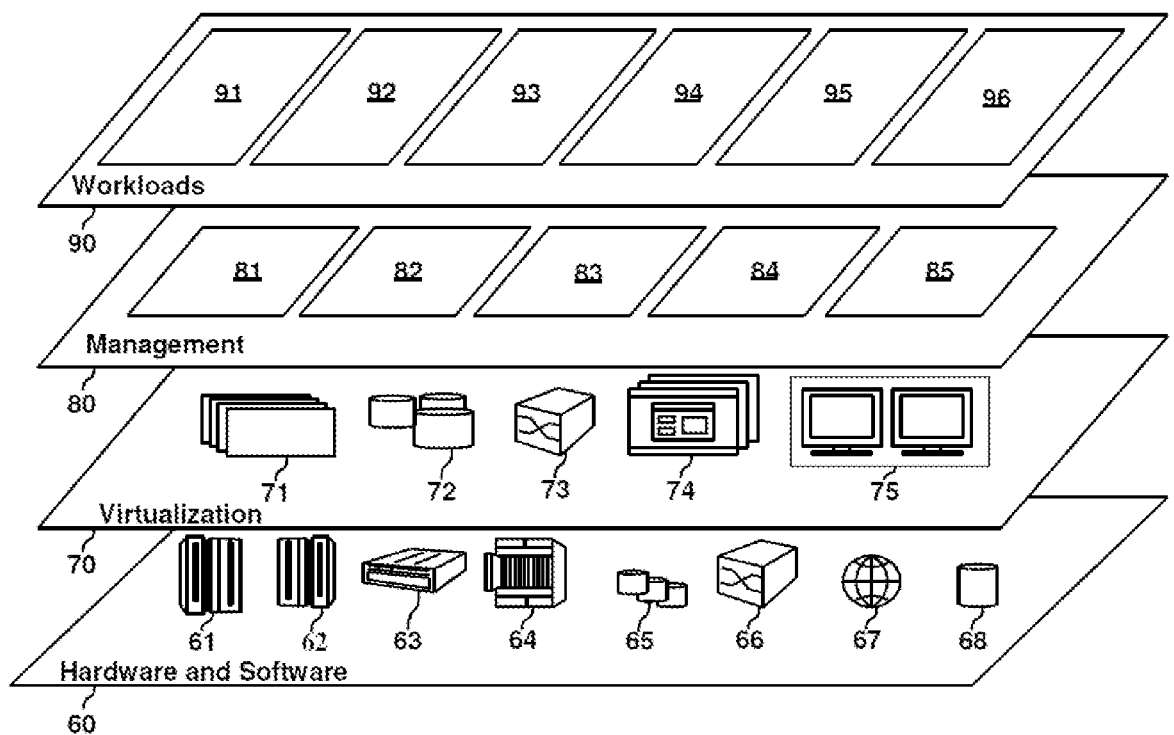
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and orchestration of methods, systems, and computer program products for the self-learning selection of information-analysis runtimes.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
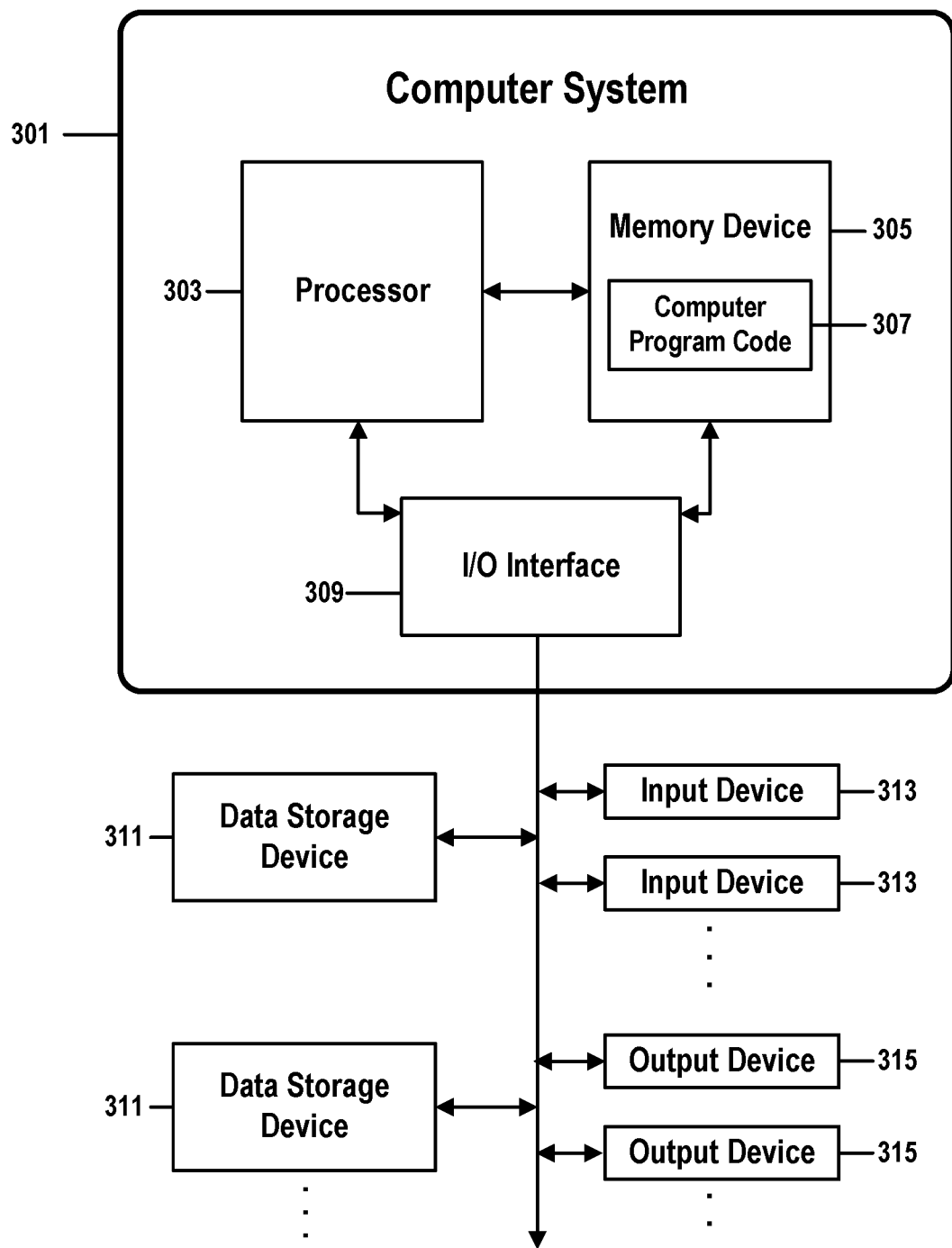
FIG. 3 shows the structure of a computer system and computer program code that may be used to implement a method for self-learning selection of information-analysis runtimes in accordance with embodiments of the present invention.

FIG. 3 shows a structure of a computer system and computer program code that may be used to implement a method for self-learning selection of information-analysis runtimes in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for self-learning selection of information-analysis runtimes in accordance with embodiments of the present invention, and may implement other embodiments described in this specification, including the methods illustrated in FIGS. 1-5. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for self-learning selection of information-analysis runtimes.

Any of the components of the present invention could be created, integrated, hosted, maintained, deployed, managed, serviced, supported, etc. by a service provider who offers to facilitate a method for self-learning selection of information-analysis runtimes. Thus the present invention discloses a process for deploying or integrating computing infrastructure, comprising integrating computer-readable code into the computer system 301, wherein the code in combination with the computer system 301 is capable of performing a method for self-learning selection of information-analysis runtimes.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for self-learning selection of information-analysis runtimes may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for self-learning selection of information-analysis runtimes is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
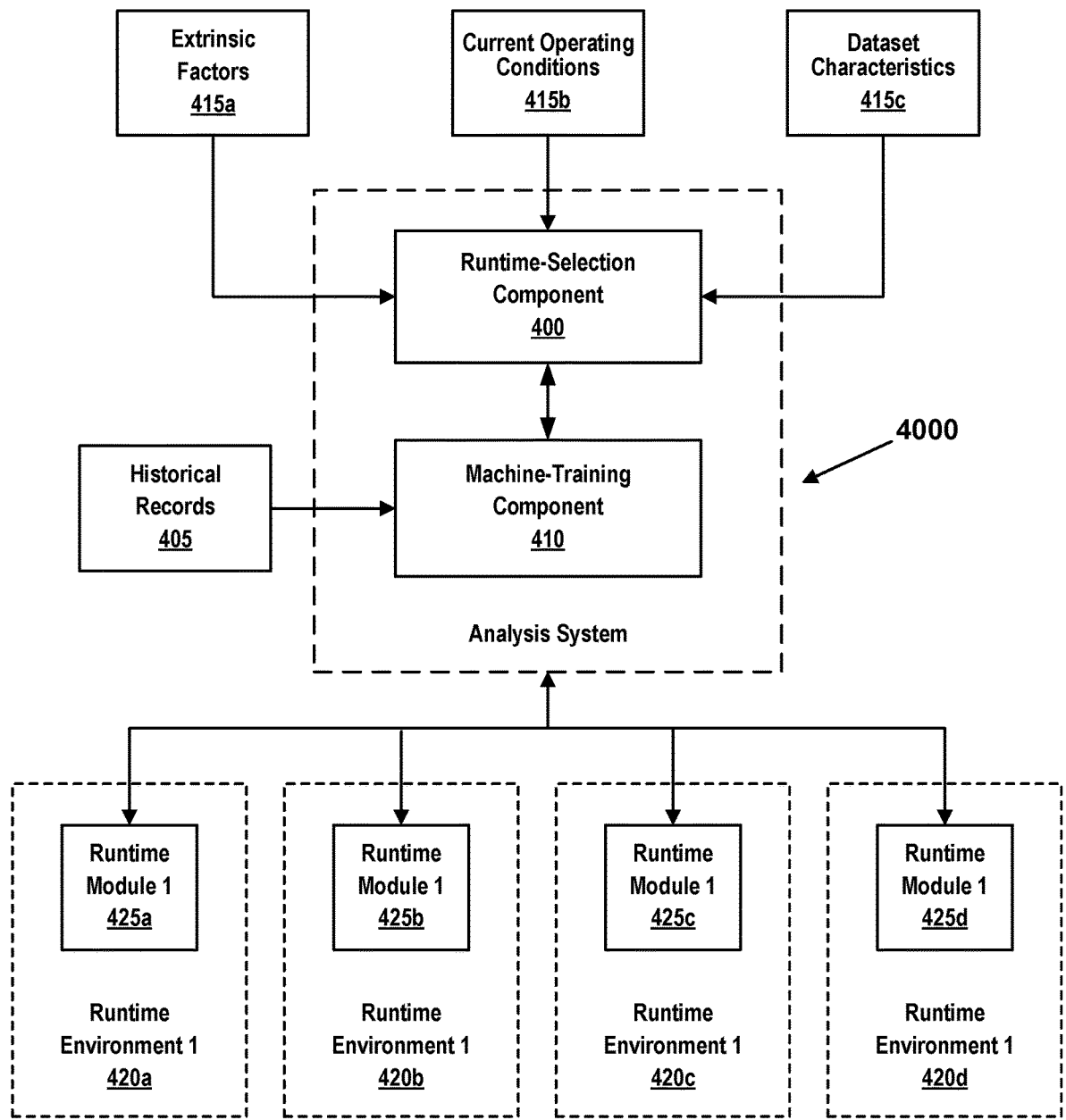
FIG. 4 shows a high-level structure and operating environment of an information-analysis system that performs a self-learning selection of information-analysis runtimes in accordance with embodiments of the present invention.

FIG. 4 shows a high-level structure and operating environment of an information-analysis system 4000 that performs a self-learning selection of information-analysis runtimes in accordance with embodiments of the present invention. FIG. 4 shows items 400-425d and 4000.

FIG. 4 shows several components of information-analysis system 4000, but in real-world implementations, system 4000 could contain a large number of other components. Furthermore, the embodiment shown in FIG. 4 should not be construed to limit embodiments of the present invention to improved information-analysis systems. As explained above, the present invention is flexible enough to be incorporated into other types of self-learning systems, including data-analysis systems, that intelligently select a particular runtime program or runtime environment from multiple runtimes that are capable of implementing a desired algorithm.

In the example of FIG. 4, information system 4000 includes:

a runtime-selection component 400 that, in accordance with embodiments of the present invention, responds to a request to run a particular algorithm on a particular dataset by intelligently selecting, from candidate runtime modules 425a-425d, an optimal runtime program that will run the algorithm most efficiently or with the highest performance; and a machine-training component 410 that, employing methods of machine-learning, trains runtime-selection component 400 to accurately identify and select an optimal runtime programs from candidate runtime modules 425a-425d or an optimal runtime environment from candidate runtime environments 420a-420d.

Machine-training component 410 employs known methods of machine-learning to train runtime-selection component 400. These methods can include submitting a machine-learning corpus to runtime-selection component 400, where the corpus identifies past results produced by selecting a particular runtime module, or by selecting a particular runtime environment, to perform a desired algorithm while certain sets of conditions existed. In this way, machine-training component 410 teaches runtime-selection component 400 how to predict, based on the existence of particular combinations of conditions, the effect of specific module or runtime environment selections.

The data and logic in these corpora may be retrieved by machine-training component 410 from a variety of sources. These sources can include a variety of historical records 405, but the embodiments and examples of FIG. 4 should not be construed to limit embodiments to only the types of historical sources 405 described here. The present invention is flexible enough to provide embodiments that comprise other data sources known in the art to be capable of being incorporated into the machine-learning corpus.

Historical records 405 may include information describing any sort of past occurrence from which the system 4000 may infer a relationship between previous runtime selections and the results of such selections. For example, historical records 405 could include system logs that show the results of selecting different runtimes to perform a particular algorithm. If these records show that a first runtime consistently provided higher performance or lower costs, then the runtime-selection component 400 would infer from a corpus comprising the information in those records 405 that the first runtime should in general be the first choice whenever it is necessary to perform the particular algorithm.

Similarly, records 405 could include performance logs from multiple runtime environments, as well as information correlating the results of runtime selections with particular characteristics of input datasets. These records could show that performing the particular algorithm in a first runtime environment has consistently provided the highest performance on input datasets smaller than 1 GB, and that performing the particular algorithm in a second runtime environment provided the highest performance on input datasets larger than 1 GB. In this case, the machine-training component 410, by creating and submitting a corpus comprising this information to runtime-selection component 400, would train runtime-selection component 400 to consider the size of an input dataset when predicting the outcome of choosing either the first runtime or the second runtime to perform the particular algorithm on the input dataset.

Records 405 can also correlate the outcome of a runtime selection with factors and considerations culled from various platform and extrinsic sources. For example, weather records may indicate that during a rainy season, a particular runtime environment is more vulnerable to power outages. And a system log could identify that a certain runtime might take longer to run during certain heavy-usage times of the day or costs less to run on weekend and evenings, when utilization fees for a hosted cloud environment are discounted.

Machine-training component 410 may populate training corpora with any other type of logic, correlations, or rules inferred from historical records 405. In all cases, these inferences correlate runtime choices and concurrent conditions with the performance, efficiency, and accuracy likely to be produced by a specific runtime selection. Training component 410, selection component 400, training records 405, and associated components thus form a self-learning runtime-selection subsystem of system 4000.

Continuous training of runtime-selection component 400 in this manner by machine-training component 410, teaches selection component 400 how to respond to a request from other components of system 4000, or from other applications, users, or systems, to run a particular algorithm. These responses comprise selecting a runtime module of modules 425a-425d, or a runtime environment of environments 420a-420d, that runtime-selection component 400 predicts will provide superior performance, efficiency, accuracy, policy conformance, or a combination thereof.

Runtime-selection component 400 makes these selections by referring to rules inferred, during the training sessions conducted by machine-training component 410, from the corpora generated from historical records 405. As with other cognitive, self-learning applications, runtime-selection component 400 identifies conditions and factors associated with a current request to perform an algorithm, correlates those conditions and factors with similar conditions and factors that existed during previous requests, and uses those correlations to select a runtime that is most likely to produce desired results.

The current conditions and requests may comprise any sort of information that an implementer deems to be relevant to a runtime selection, including information that is not described in the embodiments and examples of FIG. 4. The present invention is flexible enough to accommodate embodiments that comprise any sort of local or extrinsic sources known in the art to be capable of providing this information.

For example, this information may include extrinsic factors 415a that identify current external considerations that runtime-selection component 400 should consider when selecting an optimal runtime. These factors 415a could include the current time of day if a system implementer is concerned about time-dependent costs or resource-utilization figures, or might specify a current weather forecast or time of year if seasonal weather-related factors are capable of affecting the performance of a runtime module of modules 425a-425d or the reliability or performance of a runtime environment of environments 420a-420d.

The information used by runtime-selection component 400 to select a runtime module can also include descriptions of current operating conditions 415b. These conditions 415b can include any current operating or platform-related information that an implementer deems to be relevant to a runtime choice. For example, conditions 415b could include current utilization and resource-loading characteristics of various runtime environments, where historical records 405 have demonstrated that those characteristics have in the past affected the relative performance of runtime modules that run in any of those environments.

Other current conditions 415b could include operating system configuration data, application version numbers, available storage capacities, data-transfer rates, database sizes, the criticality of an algorithm-performance request, the priority of a data pipeline, the security level of a requesting user or application, queue lengths, policy constraints, and other conditions capable of affecting the outcome of a runtime selection.

In one example, current conditions 415b could identify a GDPR-based policy that prohibits the copying of a mission-critical database from a relatively slow, heavily utilized platform to a faster runtime environment. This policy could be deemed relevant because of its potential effect on an otherwise-viable decision to select a runtime that performs a requested algorithm in the faster environment.

In another example, current conditions 415b could identify that, because a particular pipeline is reserved for a critical engineering function or is used exclusively by a high-priority administrative team, then less weight should be given to a higher cost incurred by selecting a runtime that uses the particular pipeline.

The information used by runtime-selection component 400 to select a runtime can also include descriptions of characteristics of an input dataset 415c. For example, if a request has been made to perform an algorithm on a first dataset, and runtime-selection component 400 knows that this algorithm can be performed most efficiently in runtime environment 1 420a only if the first dataset is larger than 100 GB, then runtime-selection component 400 considers a size characteristic of the first dataset when deciding whether to select runtime module 1 425a in runtime environment 1 420a.

Dataset characteristics 415c may comprise other characteristics of the currently requested input dataset that an implementer deems to be relevant to a runtime selection. For example, dataset characteristics 415c may identify a physical location of the dataset, a network topology that defines the speed at which the dataset can be transferred to a different location or runtime environment, a listing of runtime modules 425a-425d that are capable of performing the requested algorithm upon the input dataset, or a security constraint that prevents the dataset from being processed on certain platforms, in certain runtime environments 420a-420d, or by certain applications.

By referring to information culled from sources 415a-415c, runtime-selection component 400 may intelligently apply rules learned from its prior training by machine-training component 410. The application of these rules allows runtime-selection component 400 to cognitively select a runtime module of modules 425a-425d or a runtime environment of environments 420a-420d that has in the past produced the most desirable results in the presence of conditions similar to those described by sources 415a-415c.

In some embodiments, runtime-selection component 400, after selecting a runtime module 425a, 425b, 425c, or 425d or runtime environment 420a, 420b, 420c, or 420d, either runs the selection or directs a downstream component to run the selection. In certain embodiments, runtime-selection component 400 first forwards its selection to a user, administrator, or computerized module for confirmation before proceeding.

In yet other embodiments, runtime-selection component 400 or machine-training component 410 monitors the result of performing a selection or receives feedback from users or downstream systems about a selection. In these embodiments, the feedback or logged results of the module selection, or of the performance of the algorithm by the selected module, is incorporated into corpora by machine-training component 410 in order to further train runtime-selection component 410.

Figure 5:
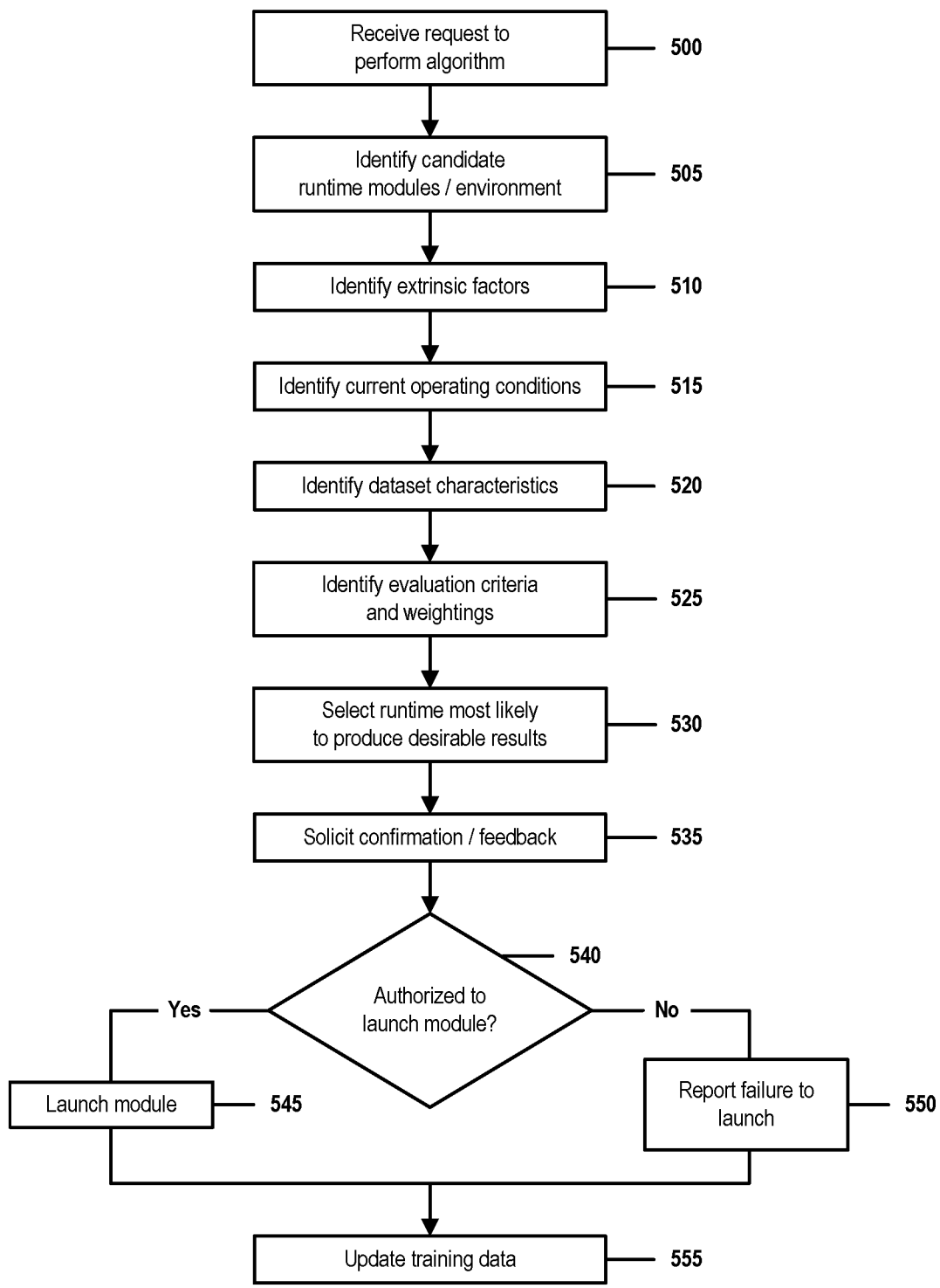
FIG. 5 is a flow chart that illustrates steps of a method for self-learning selection of information-analysis runtimes in accordance with embodiments of the present invention.

FIG. 5 is a flow chart that illustrates steps of a method for self-learning selection of information-analysis runtimes in accordance with embodiments of the present invention. FIG. 4 contains steps 500-555 which may be performed by embodiments that incorporate the structures and platforms of FIGS. 1-4.

In step 500, system 4000 receives a request to perform a particular algorithm. If, for example, system 4000 is an information-analysis system, the particular algorithm could be an algorithm that performs a data-mining procedure upon an input dataset of consumer transactional data. In this case, the request could be received from an automated e-commerce marketing module or a researcher seeking to visualize customer demographics. Similarly, if system 4000 is a data-analysis system, the particular algorithm could be an algorithm that filters and sorts an input dataset of product-reliability data in order to generate mean-time-between-failure statistics requested by a reporting system or by an engineering team leader.

In step 505, runtime-selection component 400 of system 4000 responds to the request received in step 500 by identifying candidate runtime modules 425a-425d capable of performing the particular algorithm. Selection component 400 may also in this step identify candidate runtime environments 420a-420d in which each of the runtime modules are capable of running.

Candidates may be identified by means known in the art, such as by referring to stored data that identifies configuration information of system 4000 or by retrieving identifications from a table that cross-references each algorithm with the runtime modules and runtime environments that implement each algorithm.

In step 510, selection component 400 identifies extrinsic factors 415a that describe currently existing external considerations capable of affecting selection component 410's selection of a runtime module. Selection component 400 performs this identification by means of rules learned or stored, as in a knowledgebase, during previous machine-learning training sessions conducted by machine-training component 410. As explained in FIG. 4, these previous sessions taught selection component 400 how to correlate the previous existence of combinations of extrinsic factors with the results of prior selections of candidate runtime modules made in response to similar requests to perform the particular algorithm.

In step 515, selection component 400 identifies current operating conditions 415b that describe current operating or platform-related information deemed to be relevant to a runtime choice. Selection component 400 performs this identification by means of rules learned or stored, as in a knowledgebase, during previous machine-learning training sessions conducted by machine-training component 410. As explained in FIG. 4, these previous sessions taught selection component 400 how to correlate past operating conditions with the results of prior selections of candidate runtime modules made in response to similar requests to perform the particular algorithm.

In step 520, selection component 400 identifies input-dataset characteristics 415c that describe current operating or platform-related information deemed to be relevant to a runtime choice. Selection component 400 performs this identification by means of rules learned or stored, as in a knowledgebase, during previous machine-learning training sessions conducted by machine-training component 410. As explained in FIG. 4, these previous sessions taught selection component 400 how to correlate characteristics of an input dataset with the results of prior runtime selections made in response to similar requests to perform the particular algorithm.

In step 525, selection component 400 identifies evaluation criteria that should be used to identify which results of performing the particular algorithm are most desirable. Evaluation criteria could, for example, specify that the highest-performing runtime module should be selected or that the selected module should be performed in a runtime environment that incurs the lowest cost to run the algorithm.

Other selection criteria might include a specification that selection component 400 should select a runtime that has in the past, when certain conditions existed, produced a most accurate result. Another selection criterion might require that the particular algorithm to be performed on a dataset in the dataset's native environment, rather than forcing the dataset to be copied to a certain remote runtime environment before performing the algorithm.

Selection criteria can specify any conditions desired by an implementer, including implementation-dependent, technology-dependent, or platform-dependent conditions, or criteria that require the selection to conform with security, privacy, or business-related policies, or with industry conventions or standards.

Embodiments also allow implementers to define more complex selection criteria that comprise multiple considerations or conditional combinations of simpler criteria. For example, selection criteria may specify that when an algorithm is to be run during a heavy-usage time of day, on a weekday during a non-holiday week, and storage-availability constraints or data-security policies bar the movement of the input dataset to a less-heavily utilized platform, then datasets larger than 1 TB should be processed in the dataset's native environment by a runtime module that intelligently allocates each step of the algorithm to servers that at the time do not exceed a threshold processor-utilization limit.

In some embodiments, each selection condition of a multiple-condition selection criterion may be weighted or conditionally weighted. For example, given a certain set of operating conditions, dataset characteristics, and extrinsic factors, selection component 400 may select a runtime module by considering both the expected performance and the expected cost of running the selected module. If the algorithm is to be run in a production runtime environment, the expected performance might be assigned twice the weight assigned to the expected cost when selecting a runtime module. But if the algorithm is of a kind that will be run on an Engineering Department's runtime environment, the selection might be made by giving cost twice the weight that is given to performance.

Similarly, if running a certain module would consume bandwidth on a costly, high-performance data pipeline, the cost of using that pipeline might be given a lower weight when choosing whether to select the certain module if the requesting user is a high-priority user known to be authorized to consume unlimited pipeline resources.

Selection component 400 identifies these and other selection criteria as a function of rules, correlations, and inferences learned during prior machine-learning training sessions. These rules, correlations, and inferences are derived from historical records 402 and, as described above, have been taught to the selection component 400 by machine-training component 410.

In step 530, selection component 400, using criteria identified in step 525 and considering current factors identified in steps 510-520, selects a runtime module 425a, 425b, 425c, or 425d or runtime environment 420a, 420b, 420c, or 420d. Selection component 400 attempts to select the runtime module or environment that best satisfies the selection criteria.

In optional step 535, system 4000, selection component 400, or machine-training component 410 notifies the user or system that requested performance of the particular algorithm in step 500 that a runtime module or runtime environment has been selected. In some embodiments, other users or systems may be notified.

The system or component may then request feedback from the notified entity, such as an express confirmation to proceed with running the selected runtime module. In some embodiments, the system or component may request other types of feedback from the notified entity, such as a quantification of the notified entity's satisfaction with the selection.

In step 540, system 4000 determines whether the notified entity has confirmed that the selected runtime module should be run.

In step 545, if the notified entity has confirmed that the selected module should be run, system 4000 launches the selected module in the selected runtime environment or directs a downstream system to launch the selected module in the selected runtime environment. In embodiments where optional steps 535 and 540 are not performed, step 545 is performed by default.

In step 550, if the notified entity has not confirmed that the selected module should be run, system 4000 reports this failure to an administrative module, human administrator, or other entity authorized to manage the operation of system 4000.

In step 555, machine-training component 410 records the results of the method of FIG. 4. These results may include:
identification of the requested algorithm,
the existence of extrinsic factors 415a, operating conditions 415b, and dataset characteristics 415c,
selection criteria used to select a runtime module 425a-425d or runtime environment 420a-420d,
whether an authorized user or system authorized the performance of the selected runtime,
if the selected module is run, an identification of the outcome of the performance of the algorithm. This outcome may identify any factors deemed relevant by an implementer, including a comparison of how predicted parameters related to the selection criteria (such as performance, resource-utilization, or cost) compared with the actual values of these parameters during the performance of the algorithm, and
any further user feedback or comments regarding the selection or the outcome of the performance of the selected module.

These recordings may be stored in any of the repositories 405 or 415a-415c and may be incorporated by machine-training component 410 into future corpora used to train selection component 400. In this way, system 4000 continues to self-learn how to more intelligently select runtime modules and runtime environments by more accurately predicting the outcomes or results of future selections.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:
1. A self-learning information-analysis system comprising a processor, a memory coupled to the processor, and a computer-readable hardware storage device coupled to the processor, the storage device containing program code configured to be run by the processor via the memory to implement a method for self-learning selection of information-analysis runtimes, the method comprising:

the system receiving a request to perform an algorithm, where the system has access to a plurality of runtime modules that are each designed to perform the algorithm;

the system identifying a set of influencing factors capable of influencing the system's selection of an optimal runtime module, from the plurality of runtime modules, to perform the requested algorithm;

the system predicting outcomes that would be produced by running, in response to the request, each module of the plurality of runtime modules, where the system has been trained to predict the outcomes by a machine-learning component that infers future outcomes from a record of previous outcomes produced by running any of the plurality of runtime modules in a presence of at least one factor of the set of influencing factors;

the system selecting an optimal runtime module of the plurality of runtime modules as a function of the predicting; and the system initiating steps that direct the optimal runtime module to perform the algorithm.

2. The system of claim 1, where at least two of the plurality of runtime modules are configured to run in different runtime environments, and where the optimal runtime module is selected as a function of a runtime environment in which each module of the plurality of runtime modules is configured to run.

3. The system of claim 1, where each factor of the set of influencing factors identifies a value selected from the group consisting of:

value of extrinsic factors that identify current conditions that are external to the system and that are external to the platform on which the system is implemented, values of operating conditions that identify current characteristics of one or more components of the platform on which the system is implemented, and dataset characteristics that characterize a dataset upon which the algorithm is to be performed.

4. The system of claim 1, further comprising:

the system receiving feedback about the system's selection of the optimal runtime module, where the feedback is used, by the machine-learning component, to further train the system to more accurately predict future outcomes produced by running the optimal runtime module.

5. The system of claim 1, further comprising:

the system requesting and receiving authorization for the system to initiate steps that direct the optimal runtime module to perform the algorithm, where the authorization is used, by the machine-learning component, to further train the system to more accurately predict future outcomes produced by running the optimal runtime module.

6. The system of claim 1, where the selecting is performed as a further function of selection criteria selected from the group consisting of: resource efficiency, cost, accuracy, performance, security, privacy, data-pipeline priority, policy compliance, and conformance to conventions and standards.

7. The system of claim 6, where at least one criterion of the selection criteria is assigned a weighting that alters a degree of influence of the one criterion upon the selection, relative to degrees of influence upon the selection of other criteria of the selection criteria.

8. A method for self-learning selection of information-analysis runtimes, the method comprising:

a self-learning information-analysis system receiving a request to perform an algorithm, where the system has access to a plurality of runtime modules that are each designed to perform the algorithm;

the system identifying a set of influencing factors capable of influencing the system's selection of an optimal runtime module, from the plurality of runtime modules, to perform the requested algorithm;

the system predicting outcomes that would be produced by running, in response to the request, each module of the plurality of runtime modules, where the system has been trained to predict the outcomes by a machine-learning component that infers future outcomes from a record of previous outcomes produced by running any of the plurality of runtime modules in a presence of at least one factor of the set of influencing factors;

the system selecting an optimal runtime module of the plurality of runtime modules as a function of the predicting; and the system initiating steps that direct the optimal runtime module to perform the algorithm.

9. The method of claim 8, where at least two of the plurality of runtime modules are configured to run in different runtime environments, and where the optimal runtime module is selected as a function of a runtime environment in which each module of the plurality of runtime modules is configured to run.

10. The method of claim 8, where each factor of the set of influencing factors identifies a value selected from the group consisting of:

value of extrinsic factors that identify current conditions that are external to the system and that are external to the platform on which the system is implemented, values of operating conditions that identify current characteristics of one or more components of the platform on which the system is implemented, and dataset characteristics that characterize a dataset upon which the algorithm is to be performed.

11. The method of claim 8, further comprising:

the system receiving feedback about the system's selection of the optimal runtime module, where the feedback is used, by the machine-learning component, to further train the system to more accurately predict future outcomes produced by running the optimal runtime module.

12. The method of claim 8, further comprising:

the system requesting and receiving authorization for the system to initiate steps that direct the optimal runtime module to perform the algorithm, where the authorization is used, by the machine-learning component, to further train the system to more accurately predict future outcomes produced by running the optimal runtime module.

13. The method of claim 8, where the selecting is performed as a further function of selection criteria selected from the group consisting of: resource efficiency, cost, accuracy, performance, security, privacy, data-pipeline priority, policy compliance, and conformance to conventions and standards, and where at least one criterion of the selection criteria is assigned a weighting that alters a degree of influence of the one criterion upon the selection, relative to degrees of influence upon the selection of other criteria of the selection criteria.

14. The method of claim 8, further comprising providing at least one support service for at least one of creating, integrating, hosting, maintaining, and deploying computer-readable program code in the computer system, wherein the computer-readable program code in combination with the computer system is configured to implement the receiving, the identifying, the predicting, the selecting, and the initiating.

15. A computer program product, comprising a computer-readable hardware storage device having a computer-readable program code stored therein, the program code configured to be executed by An information-analysis system comprising a processor, a memory coupled to the processor, and a computer-readable hardware storage device coupled to the processor, the storage device containing program code configured to be run by the processor via the memory to implement a method for self-learning selection of information-analysis runtimes, the method comprising:
- the system receiving a request to perform an algorithm, where the system has access to a plurality of runtime modules that are each designed to perform the algorithm;
- the system identifying a set of influencing factors capable of influencing the system's selection of an optimal runtime module, from the plurality of runtime modules, to perform the requested algorithm;
- the system predicting outcomes that would be produced by running, in response to the request, each module of the plurality of runtime modules,
  - where the system has been trained to predict the outcomes by a machine-learning component that infers future outcomes from a record of previous outcomes produced by running any of the plurality of runtime modules in a presence of at least one factor of the set of influencing factors;
- the system selecting an optimal runtime module of the plurality of runtime modules as a function of the predicting; and
- the system initiating steps that direct the optimal runtime module to perform the algorithm.

16. The computer program product of claim 15, where at least two of the plurality of runtime modules are configured to run in different runtime environments, and
where the optimal runtime module is selected as a function of a runtime environment in which each module of the plurality of runtime modules is configured to run.

17. The computer program product of claim 15, where each factor of the set of influencing factors identifies a value selected from the group consisting of:
- value of extrinsic factors that identify current conditions that are external to the system and that are external to the platform on which the system is implemented,
- values of operating conditions that identify current characteristics of one or more components of the platform on which the system is implemented, and
- dataset characteristics that characterize a dataset upon which the algorithm is to be performed.

18. The computer program product of claim 15, further comprising:
- the system receiving feedback about the system's selection of the optimal runtime module,
  - where the feedback is used, by the machine-learning component, to further train the system to more accurately predict future outcomes produced by running the optimal runtime module.

19. The computer program product of claim 15, further comprising:
- the system requesting and receiving authorization for the system to initiate steps that direct the optimal runtime module to perform the algorithm,
  - where the authorization is used, by the machine-learning component, to further train the system to more accurately predict future outcomes produced by running the optimal runtime module.

20. The computer program product of claim 15, where the selecting is performed as a further function of selection criteria selected from the group consisting of: resource efficiency, cost, accuracy, performance, security, privacy, data-pipeline priority, policy compliance, and conformance to conventions and standards, and
where at least one criterion of the selection criteria is assigned a weighting that alters a degree of influence of the one criterion upon the selection, relative to degrees of influence upon the selection of other criteria of the selection criteria.

* * * * *